US012763526B2

(12) United States Patent
Kao

(10) Patent No.: US 12,763,526 B2
(45) Date of Patent: Oct. 13, 2026

(54) CONNECTOR ASSEMBLY WITH GROUNDING MEMBER PROTECTION PROTRUSIONS

(71) Applicant: MOLEX, LLC, Lisle, IL (US)

(72) Inventor: Ming-Huei Kao, New Taipei City (TW)

(73) Assignee: Molex, LLC, Lisle, IL (US)

( * ) Notice: Subject to any disclaimer, the term of this patent is extended or adjusted under 35 U.S.C. 154(b) by 384 days.

(21) Appl. No.: 18/129,153

(22) Filed: Mar. 31, 2023

(65) Prior Publication Data

US 2023/0318236 A1 Oct. 5, 2023

(30) Foreign Application Priority Data

Apr. 1, 2022 (CN) ........................ 202220768071.6

(51) Int. Cl.

| | |
|---|---|
| ***H01R 13/6596*** | (2011.01) |
| ***H01R 13/6582*** | (2011.01) |
| ***H01R 13/6583*** | (2011.01) |
| *H01R 13/648* | (2006.01) |
| *H01R 13/658* | (2011.01) |
| *H01R 13/6581* | (2011.01) |
| *H01R 13/6585* | (2011.01) |

(Continued)

(52) U.S. Cl.

CPC ..... *H01R 13/6596* (2013.01); *H01R 13/6582* (2013.01); *H01R 13/6583* (2013.01); *H01R 13/648* (2013.01); *H01R 13/658* (2013.01); *H01R 13/6581* (2013.01); *H01R 13/6585* (2013.01); *H01R 13/6586* (2013.01); *H01R 13/6587* (2013.01); *H01R 13/6591* (2013.01); *H01R 13/6594* (2013.01)

(58) Field of Classification Search

CPC ............ H01R 13/6596; H01R 13/6582; H01R 13/6583; H01R 13/648; H01R 13/658; H01R 13/6581; H01R 13/6585; H01R 13/6586; H01R 13/6587; H01R 13/6591; H01R 13/6594

See application file for complete search history.

(56) References Cited

U.S. PATENT DOCUMENTS 11,355,884 B2 * 6/2022 Yang .................... H01R 13/659

FOREIGN PATENT DOCUMENTS

| | | | |
|---|---|---|---|
| CN | 205621959 U | | 10/2016 |
| CN | 208480212 U | * | 2/2019 |

(Continued)

*Primary Examiner* — Justin M Kratt

(57) ABSTRACT

A connector assembly includes a metal shielding cage and a grounding member. The metal shielding cage has an insertion space and a top wall, a bottom wall, and two side walls which define the insertion space. The grounding member is provided at a front end opening of the metal shielding cage and has inner side elastic fingers positioned to an inner side of the metal shielding cage. The metal shielding cage is constructed with a protecting protrusion formed on an inner side surface of at least one of the top wall, the bottom wall, and the two side walls. The protecting protrusion is adjacent to the corresponding inner side elastic finger, is positioned behind an inner side elastic finger and protrudes toward the insertion space. The protecting protrusion can avoid the pluggable module from hooking and pulling the tip of the corresponding inner side elastic finger when the pluggable module is pulled out from the insertion space.

15 Claims, 7 Drawing Sheets

(51) Int. Cl.

| | |
|---|---|
| *H01R 13/6586* | (2011.01) |
| *H01R 13/6587* | (2011.01) |
| *H01R 13/6591* | (2011.01) |
| *H01R 13/6594* | (2011.01) |

(56) References Cited

FOREIGN PATENT DOCUMENTS

| | | | |
|---|---|---|---|
| TW | I533529 | B | 5/2016 |
| TW | M528537 | U | 9/2016 |

* cited by examiner

CONNECTOR ASSEMBLY WITH GROUNDING MEMBER PROTECTION PROTRUSIONS

CROSS-REFERENCE TO RELATED APPLICATION

This application claims the priority of Chinese Patent Application No. 202220768071.6, filed Apr. 1, 2022, the disclosure of which is incorporated herein by reference in its entirety.

TECHNICAL FIELD

The present disclosure relates to a connector assembly, and particularly relates to a connector assembly which has a grounding member.

BACKGROUND

Chinese utility model application issuance publication CN205621959U (corresponding to China Taiwanese utility model application issuance publication TWM528537) discloses that, a first elastic piece unit positioned to an inner side of a metal shell has a plurality of fingers, a tip of the finger has a hook portion which extends and passes through a corresponding latching aperture and two wing portions which protrude from two sides of the hook portion respectively, two wing portions and the first elastic piece unit are positioned to two opposite sides of the metal shell respectively, and are used to abut against the metal shell so as to prevent the hook portion from being detached from the latching aperture. Although the hook portion of the tip of the finger hooks on the latching aperture, when a plug is inserted into the metal shell, the plug will press against the plurality of fingers of the first elastic piece unit which is positioned to the inner side of the metal shell, the tips of the plurality of fingers still each generate a warp toward the inside of the metal shell. Therefore, in a process that the plug is pulled out from the metal shell, if a surface of the plug is not completely flat (for example, there is a step, a depression, a bump and the like on the surface of the plug), the plug may hook the tip of the corresponding finger which warps toward the inside of the metal shell, such that the plug is caught to be difficult to be pulled out, or is forcedly pulled out to damage the corresponding finger even damage the whole structure of the metal shell.

SUMMARY

Therefore, one object of the present disclosure is to provide a connector assembly which can improve at least one problem in the prior art.

Accordingly, in some embodiments, a connector assembly of the present disclosure comprises a metal shielding cage and a grounding member. The metal shielding cage has an insertion space and a top wall, a bottom wall and two side walls which define the insertion space, the insertion space has a front end opening. The a grounding member is provided at the front end opening of the metal shielding cage, the grounding member has a plurality of inner side elastic fingers which are positioned to an inner side of the metal shielding cage. The metal shielding cage is constructed with a protecting protrusion which is formed on an inner side surface of at least one of the top wall, the bottom wall and the two side walls, the protecting protrusion is adjacent to the corresponding inner side elastic finger and is positioned behind the corresponding inner side elastic finger, and protrudes toward the insertion space.

In some embodiments, the protecting protrusion has an elongated protruding bar which extends transversely.

In some embodiments, the protecting protrusion has a plurality of protruding blocks which are arranged transversely.

In some embodiments, the metal shielding cage is at least constructed with the protecting protrusion which is formed on the bottom wall.

In some embodiments, the metal shielding cage is at least constructed with the protecting protrusion which is formed on each of the bottom wall and the two side walls.

In some embodiments, the metal shielding cage has a plurality of latching apertures which are spaced apart from the front end opening, each inner side elastic finger has a hook portion which is assembled to the corresponding latching aperture.

In some embodiments, each inner side elastic finger further has two wing portions which protrude from two sides of the hook portion, the hook portion and the two wing portions of each inner side elastic finger pass through the corresponding latching aperture from one side of the corresponding latching aperture and bend back and latch with the other side of the corresponding latching aperture.

In some embodiments, the grounding member further has a plurality of outer side elastic fingers which are positioned to an outer side of the metal shielding cage.

The connector assembly of the present disclosure includes the protecting protrusion which is constructed to the inner side surface of at least one of the top wall, the bottom wall and two side walls of the metal shielding cage, the protecting protrusion is adjacent to the corresponding inner side elastic finger and is positioned behind the corresponding inner side elastic fingers, to avoid the pluggable module which inserts into the corresponding insertion space hooking and pulling the tip of the corresponding inner side elastic finger in a process that the pluggable module is pulled out from the corresponding insertion space, so as to function as protecting the corresponding inner side elastic finger.

BRIEF DESCRIPTION OF THE DRAWINGS

Other features and effects of the present disclosure will be apparent from embodiments referring to the drawings, in which.

DETAILED DESCRIPTION OF THE PREFERRED EMBODIMENTS

Figure 1:
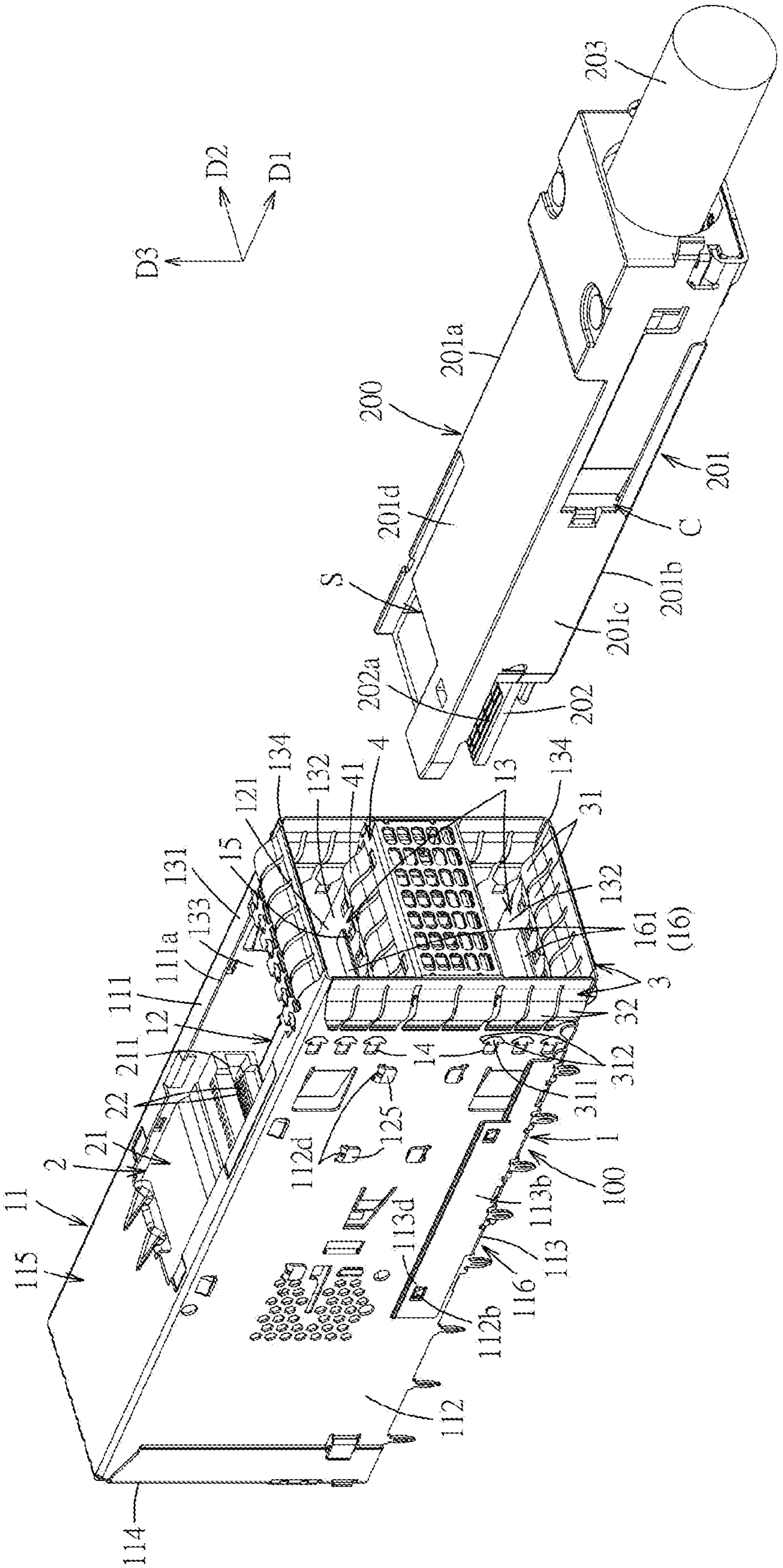
FIG. 1 is a perspective view of a first embodiment of a connector assembly of the present disclosure and a pluggable module.

Before the present disclosure is described in detail, it is noted that like elements are represented by the same reference numerals in the following description.

Referring to FIG. 1 to FIG. 4, a first embodiment of a connector assembly 100 of the present disclosure is adapted to mate with a pluggable module 200. The pluggable module 200 includes a shell 201, a mating board 202 and a cable 203, the shell 201 includes an inserting portion 201*a*, the mating board 202 is provided to a tip of the inserting portion 201*a*, and the mating board 202 has a plurality of contact fingers 202*a* thereon, the cable 203 is provided to the shell 201 and is mechanically and electrically connected to the mating board 202. The connector assembly 100 includes a metal shielding cage 1, a receptacle connector 2, a plurality of first grounding members 3, a second grounding member 4 and a lower heat dissipating module 5.

The metal shielding cage 1, for example, is formed by processing, such as stamping, bending and the like, a conductive metal plate, and used to guide the pluggable module 200 and generate a function of shielding electromagnetic interference. The metal shielding cage 1 includes a cage body 11, a partitioning frame 12 which is provided to the cage body 11, and two insertion spaces 13 which are defined together by the cage body 11 and the partitioning frame 12 and are partitioned by the partitioning frame 12. The cage body 11 extends along a front-rear direction D1 (a direction to which an arrow points is front, and an opposite direction is rear), and the cage body 11 includes a top plate 111, two side plates 112 which are spaced apart from each other and face each other along a left-right direction D2 (a direction to which an arrow points is right, and an opposite direction is left) and are connected to two sides of the top plate 111 respectively, a bottom plate 113 which is spaced apart from the top plate 111 and faces the top plate 111 along an up-down direction D3 (a direction to which an arrow points is up, and an opposite direction is down) and is connected to bottom edges of the two side plates 112, and a rear plate 114 which is connected to a rear end of the top plate 111 and rear ends of the two side plates 112.

In the present embodiment, the cage body 11 includes an upper shell 115 and a lower shell 116 which are assembled with each other and construct the insertion spaces 13, the upper shell 115 has the top plate 111 and the two side plates 112 which are integrally connected with each other, the lower shell 116 has the bottom plate 113, and the lower shell 116 is provided to the two side plates 112 of the upper shell 115 by assembling. Each side plate 112 of the upper shell 115 is formed with a recessed portion 112*a* at a bottom edge of each side plate 112 close to a front end of each side plate 112, and each side plate 112 is formed with a plurality of latching blocks 112*b* which are toward the outside. The bottom plate 113 of the lower shell 116 is integrally formed upwardly with two protruding portions 113*a* which correspondingly cooperate with the recessed portions 112*a* of the two side plates 112 and two side assembling portions 113*b* which are correspondingly assembled to outer sides of the two side plates 112. The recessed portion 112*a* is provided thereon with a front inserting portion 112*c*, the protruding portion 113*a* is provided thereon with a front inserting hole 113*c* which correspondingly cooperates with the front inserting portion 112*c*, the front inserting portion 112*c* inserts into the front inserting hole 113*c*, each side assembling portion 113*b* is formed with a plurality of latching holes 113*d* which latch with the plurality of latching blocks 112*b* of the corresponding side plate 112, so the bottom plate 113 of the lower shell 116 is capable of being assembled and engaged with the two side plates 112 of the upper shell 115.

Referring to FIG. 1 to FIG. 5, the partitioning frame 12 has an upper plate 121 and a lower plate 122 which are spaced apart from each other and faces each other in the up-down direction, two side connecting plates 123 which connect left side edges of the upper plate 121 and the lower plate 122 and right side edges of the upper plate 121 and the lower plate 122 respectively and are spaced apart from each other and face each other in the left-right direction, a front connecting plate 124 which connects a front end of the upper plate 121 and a front end of the lower plate 122, and a plurality of fixing bendable pieces 125 which are formed to the left side edge and the right side edge of the upper plate 121 and the left side edge and the right side edge of the lower plate 122. Each side plate 112 of the cage body 11 of the metal shielding cage 1 further has a plurality of fixing apertures 112*d* which cooperate with the corresponding fixing bendable pieces 125. The fixing bendable pieces 125 correspondingly pass through the plurality of fixing apertures 112*d* and then are bent, so as to make the partitioning frame 12 assembled to the two side plates 112 of the cage body 11 of the metal shielding cage 1.

Each insertion space 13 is defined together by a top wall 131, a bottom wall 132 and two side walls 133, the top wall 131, the bottom wall 132 and the two side walls 133 of the insertion space 13 which is defined to be positioned to the up are respectively constituted by the top plate 111, the upper plate 121 of the partitioning frame 12 and the two side plates 112; the top wall 131, the bottom wall 132 and the two side walls 133 of the insertion space 13 which is defined to be positioned to the down are respectively constituted by the lower plate 122 of the partitioning frame 12, the bottom plate 113 and the two side plates 112. Each insertion space 13 has a front end opening 134 which is positioned to a front end of each insertion space 13 and allows the pluggable module 200 to insert therein.

The receptacle connector 2 is provided to a rear segment of the metal shielding cage 1, and includes two receptacle housings 21 and a plurality of receptacle terminals 22, the two receptacle housings 21 and the plurality of receptacle terminals 22 are arranged in the up-down direction and are respectively provided to the two insertion spaces 13. Each receptacle housing 21 has a mating groove 211 which is toward the front, the receptacle terminals 22 are provided to the receptacle housing 21 and extend into the mating groove 211. The pluggable module 200 enters into the corresponding insertion space 13 of the metal shielding cage 1 from any one of the front end openings 134, and then, the mating board 202 at the tip of the inserting portion 201*a* of the pluggable module 200 can insert into the mating groove 211 of the corresponding receptacle housing 21 of the receptacle connector 2, so that the plurality of contact fingers 202*a* of the mating board 202 contact the receptacle terminals 22 in the corresponding mating groove 211 of the corresponding receptacle housing 21, so as to make the pluggable module 200 and the receptacle connector 2 of the connector assembly 100 mated with each other.

Moreover, a front segment of the metal shielding cage 1 adjacent to the front end opening 134 may be provided to a mounting hole (not shown) of a casing (not shown), a plurality of first grounding members 3 are provided at the cage body 11 of the metal shielding cage 1 adjacent to the two front end openings 134. The plurality of first grounding members 3 have a plurality of inner side elastic fingers 31 and a plurality of outer side elastic fingers 32 which extend rearwardly from a position of the front end opening 134 and are respectively positioned to an inner side and an outer side of the cage body 11 of the metal shielding cage 1, the plurality of first inner side elastic fingers 31 are used to contact the shell 201 of the pluggable module 200, the plurality of outer side elastic fingers 32 are used to contact parts of the casing which are positioned at a circumferential edge of the mounting hole. The second grounding member 4 is provided to the front connecting plate 124 of the partitioning frame 12, the second grounding member 4 has a plurality of inner side elastic fingers 41 which extend rearwardly from a position of the front connecting plate 124, the plurality of inner side elastic fingers 41 are positioned inside the cage body 11 of the metal shielding cage 1 and are distributed to an upper side and a lower side of the partitioning frame 12, and are used to contact the shell 201 of the pluggable module 200.

The metal shielding cage 1 has a plurality of first latching apertures 14 which are spaced apart from the front end openings 134 and are distributed to the top plate 111, the two side plates 112 and the bottom plate 113 of the cage body 11, and a plurality of second latching apertures 15 which are spaced apart from the front end openings 134 and are distributed to the upper plate 121 and the lower plate 122 of the partitioning frame 12. The plurality of inner side elastic fingers 31 of each first grounding member 3 each have a first hook portion 311 which is positioned to a tip of the corresponding inner side elastic finger 31 and is assembled to the corresponding first latching aperture 14 of the cage body 11, and two first wing portions 312 which protrude from two sides of the first hook portion 311 respectively, the first hook portion 311 and the two first wing portions 312 of the inner side elastic finger 31 of each first grounding member 3 pass through the corresponding first latching aperture 14 from one side of the first latching aperture 14 and bend back and latch with the other side of the corresponding first latching aperture 14. The plurality of inner side elastic fingers 41 of each second grounding member 4 each have a second hook portion 411 which is positioned to a tip of the corresponding inner side elastic finger 41 and is assembled to the corresponding second latching aperture 15 of the partitioning frame 12, and two second wing portions 412 which protrude from two sides of the second hook portion 411 respectively, the second hook portion 411 and the two second wing portions 412 of the inner side elastic finger 41 of each second grounding member 4 pass through the corresponding second latching aperture 15 from one side of the corresponding second latching aperture 15 and bend back and latch with the other side of the corresponding second latching aperture 15.

Figure 2:
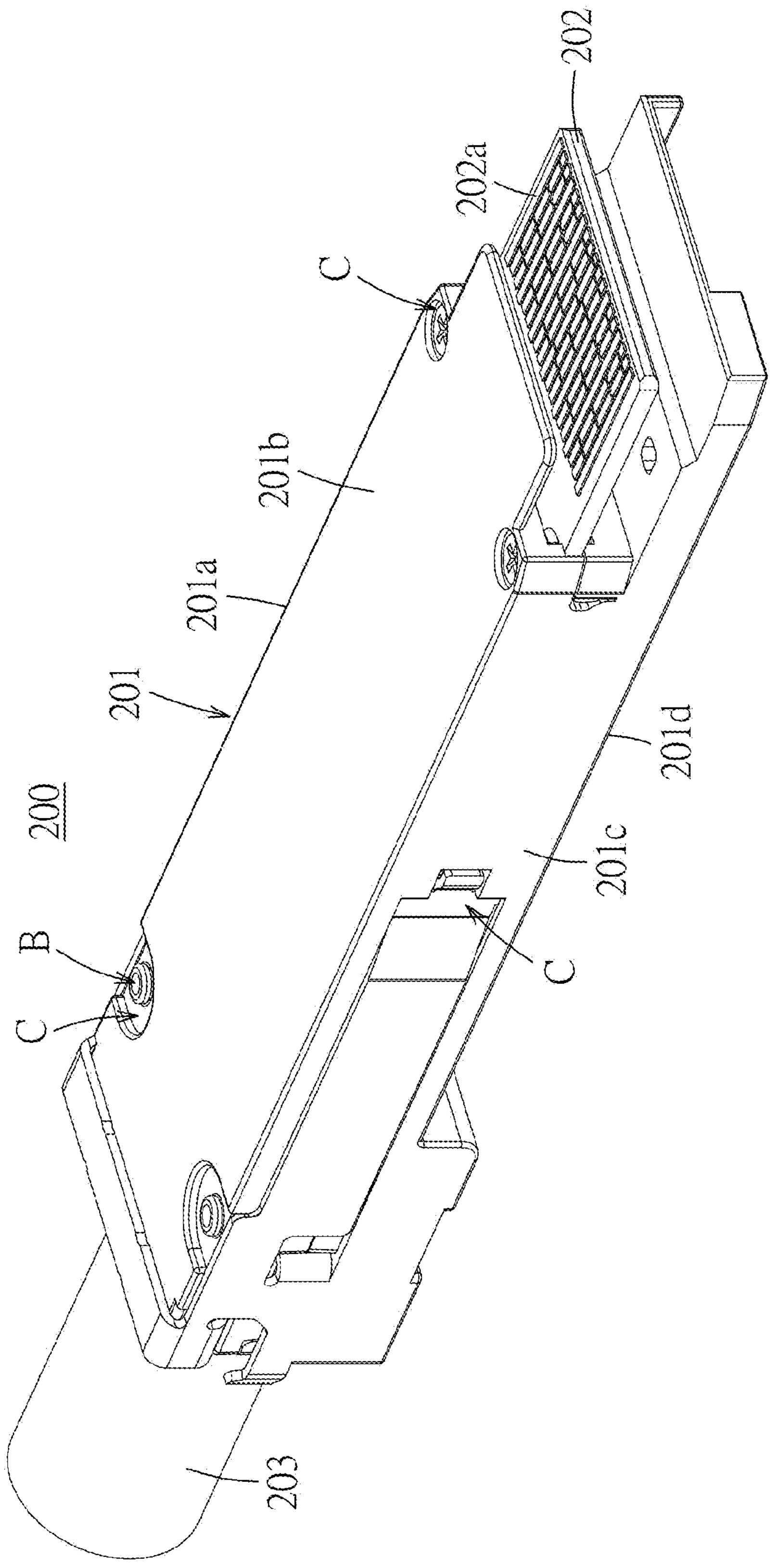
FIG. 2 is a perspective view of the pluggable module viewed from another angle.
Figure 3:
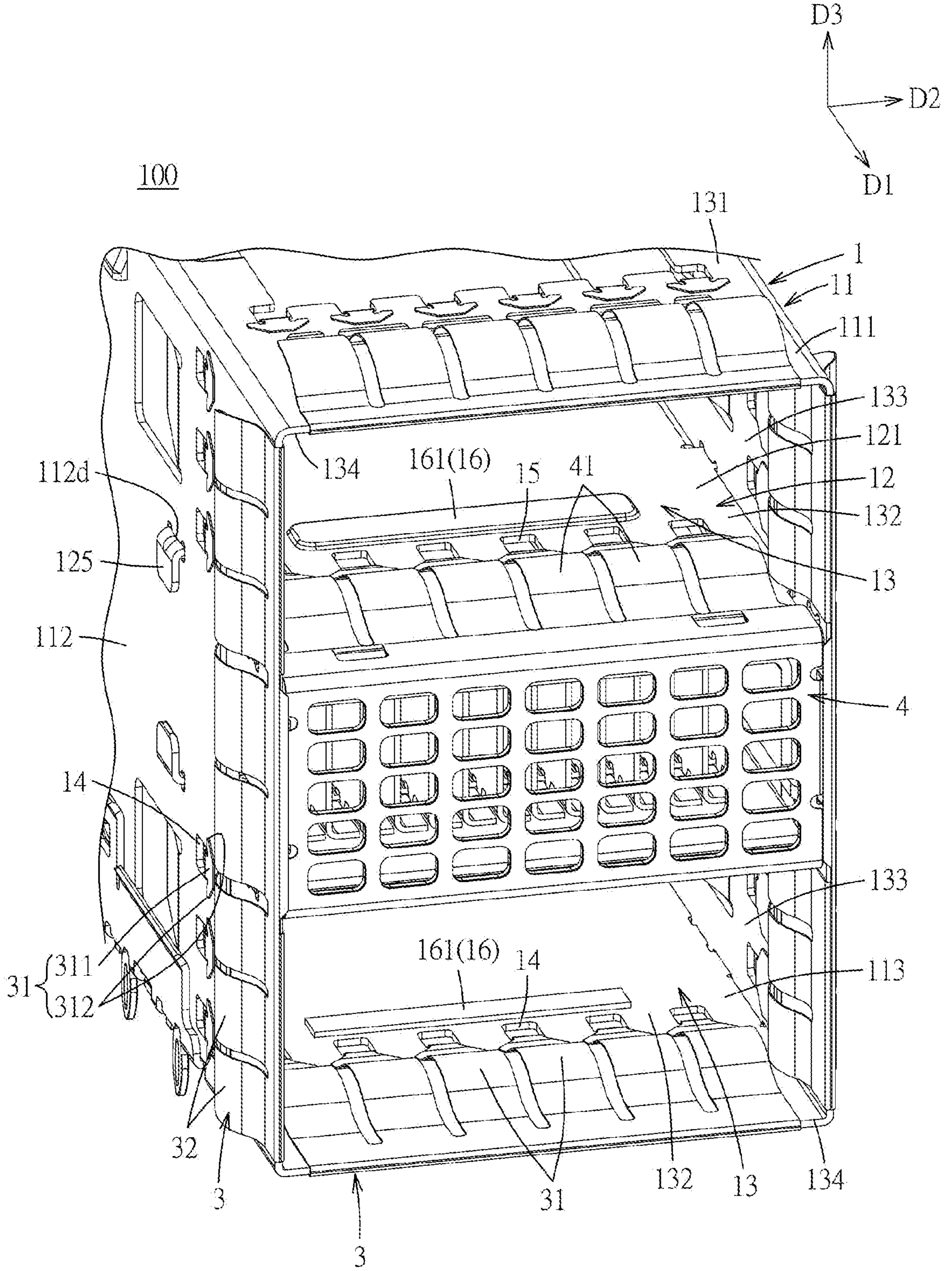
FIG. 3 is a partial perspective view of the first embodiment.
Figure 4:
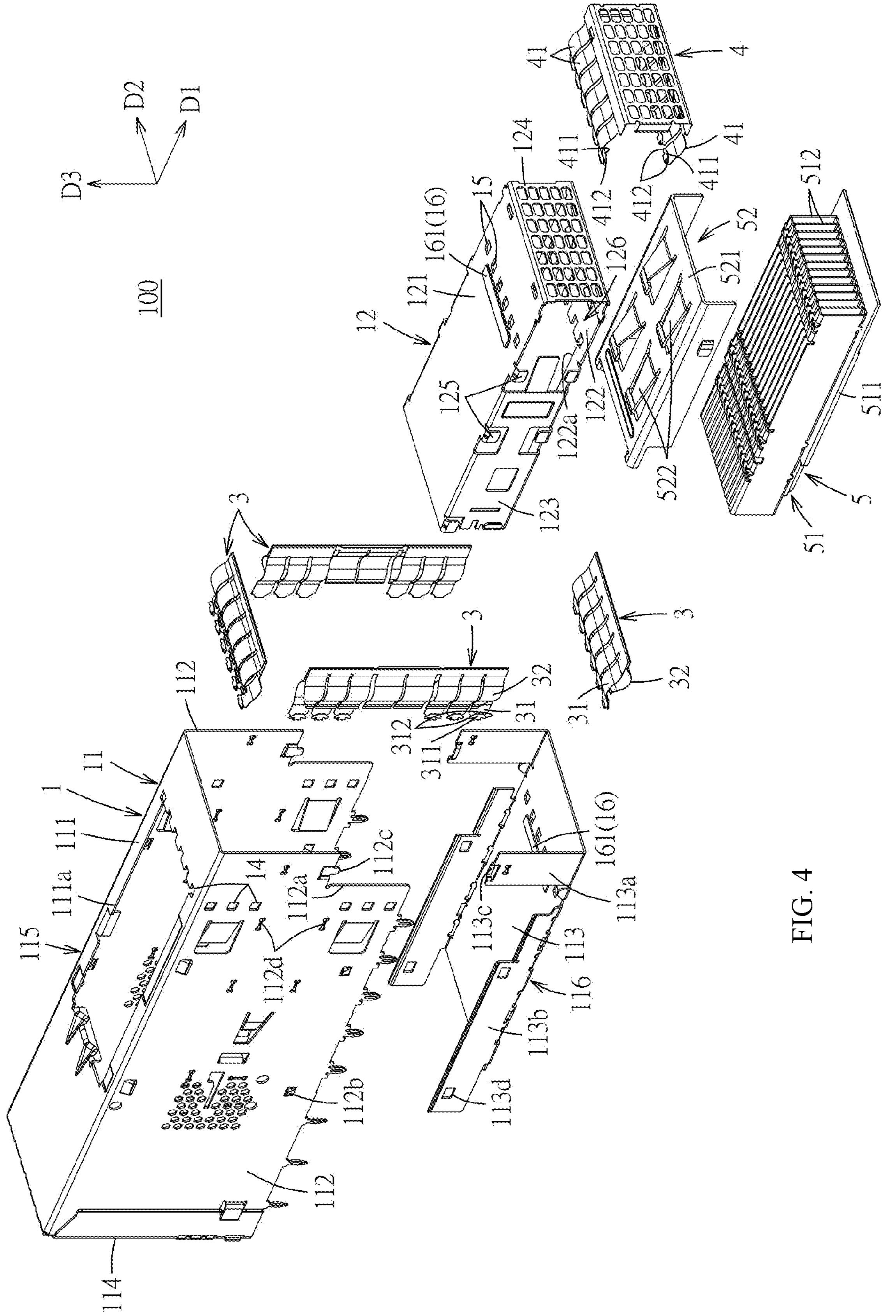
FIG. 4 is a perspective exploded view of the first embodiment with a receptacle connector of the first embodiment omitted.

In the first embodiment, the metal shielding cage 1 is constructed with protecting protrusions 16 which are formed on inner side surfaces (surfaces toward the respective insertion spaces 13 respectively) of the bottom walls 132 (the upper plate 121 of the partitioning frame 12 and the bottom plate 113), the protecting protrusions 16 are adjacent to the corresponding inner side elastic fingers 31, 41 and are positioned behind the corresponding inner side elastic finger 31, 41, and protrude toward the corresponding insertion spaces 13. For example, the protecting protrusion 16 may be a bulge construction formed by stamping, also may be a block member which is attached to the metal shielding cage 1, but the present disclosure is not limited thereto. The protecting protrusion 16 specifically has an elongated protruding bar 161 which extends transversely along the left-right direction D2. Because the protecting protrusions 16 are adjacent to the corresponding inner side elastic fingers 31, 41 and are positioned behind the corresponding inner side elastic finger 31, 41, and the protecting protrusions 16 are formed to the corresponding bottom walls 132, it can avoid a depression C or a bump B on a bottom surface 201*b* of the inserting portion 201*a* of the pluggable module 200 inserting into the corresponding insertion space 13 as shown in FIG. 2 hooking and pulling the tip of the corresponding inner side elastic finger 31 or the tip of the corresponding inner side elastic finger 41 in a process that the pluggable module 200 is pulling out from the corresponding insertion space 13.

In addition, the cage body 11 of the metal shielding cage 1 further has a top opening 111*a* which is formed to the top plate 111 and is communicated with the insertion space 13 positioned to the up, the top opening 111*a* allows an upper heat sink (not shown) of an upper heat dissipating module to enter into the insertion space 13 positioned to the up, so as to make the upper heat sink of the upper heat dissipating module can contact the pluggable module 200 which inserts into the insertion space 13 positioned to the up, in turn cooperate with the pluggable module 200 to perform heat dissipating.

The partitioning frame 12 of the metal shielding cage 1 further has an interior space 126 which is defined together by the upper plate 121, the lower plate 122, the two side connecting plates 123 and the front connecting plate 124, and a lower opening 122*a* which is formed to the lower plate 122 and is communicated between the interior space 126 and the insertion space 13 positioned to the down. The lower heat dissipating module 5 is provided in the interior space 126, and has a lower heat sink 51 and an elastic pressing member 52. The lower heat sink 51 has a lower heat dissipating base 511 which is provided to the lower plate 122, and a plurality of lower heat dissipating fins 512 which are arranged side by side and latch with each other in the left-right direction and are provided to a top surface of the lower heat dissipating base 511 by for example welding. The lower heat dissipating base 511 has a lower heat dissipating coupling portion (not shown) which is formed to a bottom of the lower heat dissipating base 511, the lower heat dissipating coupling portion downwardly enters into the insertion space 13 positioned to the down via the lower opening 122*a*. The elastic pressing member 52 is provided between the lower heat sink 51 and the upper plate 121 of the partitioning frame 12, and has a main body 521 which is provided to the lower heat sink 51, and a plurality of elastic piece 522 which are integrally formed upwardly and rearwardly from the main body 521 and are used to abut against the upper plate 121, by an elastic acting force provided by the plurality of elastic pieces 522, it can assure that, when the pluggable module 200 inserts into the insertion space 13 positioned to the down, the lower heat dissipating coupling portion of the lower heat sink 51 can maintain contact with a top surface 201*d* of the inserting portion 201*a* of the pluggable module 200 as complete as possible, so as to make the lower heat sink 51 can cooperate with the pluggable module 200 to perform heat dissipating.

Figure 5:
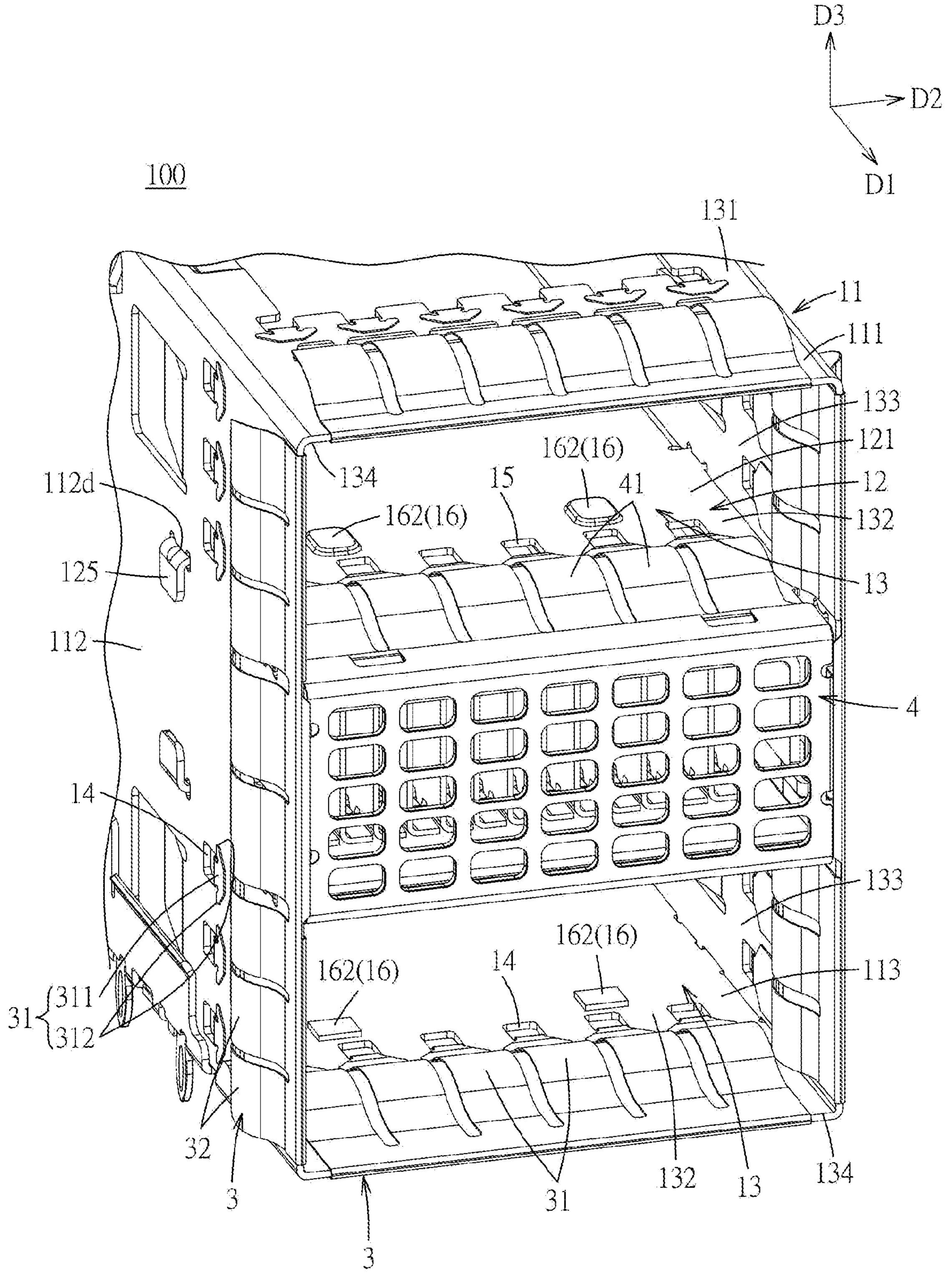
FIG. 5 is a partial perspective view of a second embodiment of the connector assembly of the present disclosure.

Referring to FIG. 5, a second embodiment of the connector assembly 100 of the present disclosure differs from the first embodiment in that, in the second embodiment, the protecting protrusion 16 specifically has a plurality of protruding blocks 162 which are arranged transversely along the left-right direction D2, specifically, the protruding block 162 on each bottom wall 132 (i.e. the upper plate 121 of the partitioning frame 12, the bottom plate 113) is two in number, but may be other in number, for example, also may be three or more, so the present disclosure is not limited to that of the second embodiment.

Figure 6:
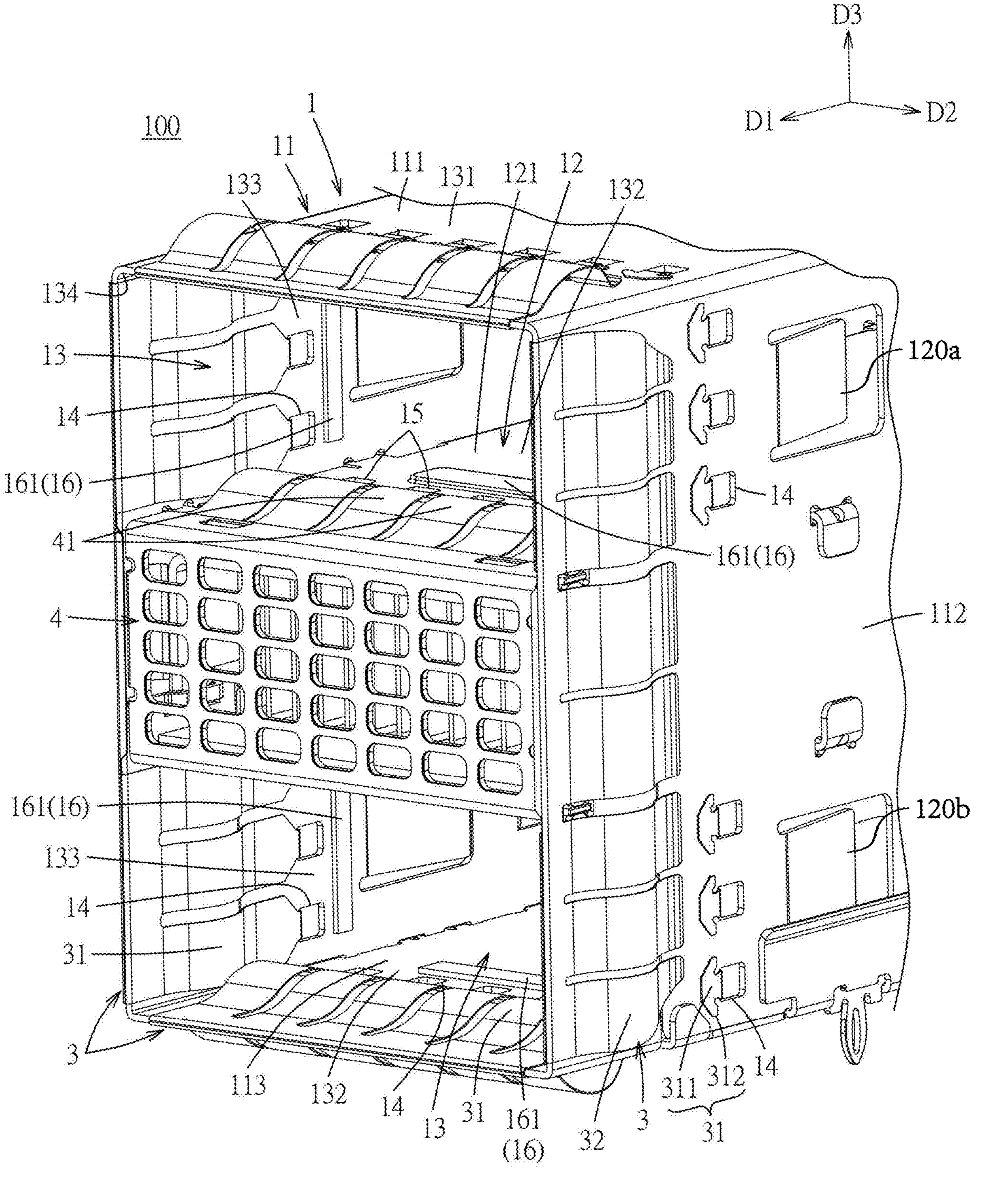
FIG. 6 is a partial perspective view of a third embodiment of the connector assembly of the present disclosure.
Figure 7:
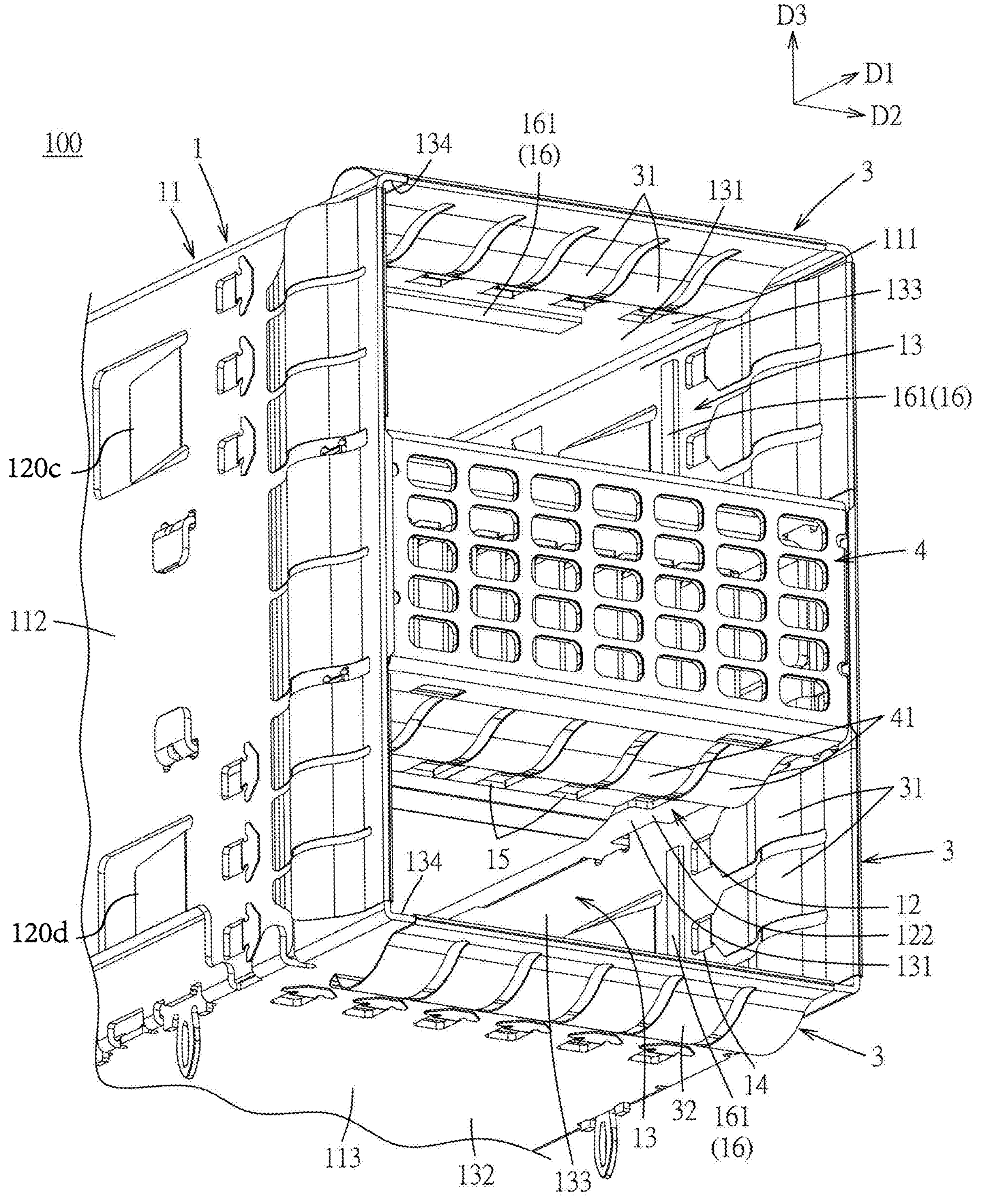
FIG. 7 is another partial perspective view of the third embodiment viewed from another angle.

Referring to FIG. 6 to FIG. 7, a third embodiment of the connector assembly 100 of the present disclosure differs from the first embodiment in that, in the third embodiment, the metal shielding cage 1 is constructed with protecting protrusions 16 which are formed on the bottom walls 132 (i.e. the upper plate 121 of the partitioning frame 12 and the bottom plate 113) and inner side surfaces of the two side walls 133 (the two side plates 112), and a protecting protrusion 16 which is formed on the top wall 131 (the top plate 111) defining the insertion space 13 positioned to the up. These protecting protrusions 16 specifically have elongated protruding bars 161 which extend transversely along the left-right direction D2 or the up-down direction D3, here, the elongated protruding bars 161 which extend along the left-right direction D2 are formed on the inner side surfaces of the bottom walls 132 (i.e. the upper plate 121 of the partitioning frame 12 and the bottom plate 113) and an inner side surface of the top wall 131 (the top plate 111), the elongated protruding bars 161 which extend along the up-down direction D3 are formed on the inner side surfaces of the two side walls 133 (the two side plates 112). The elongated protruding bars 161 which extend along the up-down direction D3 on the two side walls 133 are positioned between the inner side elastic fingers 31, 41 and the locking elastic tabs 120*a*-120*d* formed in the two side walls 133, as shown in FIGS. 6 and 7. Because these protecting protrusions 16 are adjacent to the corresponding inner side elastic fingers 31, 41 and positioned behind the corresponding inner side elastic fingers 31, 41, and these protecting protrusions 16 are formed on the bottom wall 132, the two side walls 133, and the top wall 131, it can avoid a step S, a depression C or a bump B on the bottom surface 201*b*, a side surface 201*c* or the top surface 201*d* of the inserting portion 201*a* of the pluggable module 200 inserting into the corresponding insertion space 13 (see FIG. 1 and FIG. 2) hooking and pulling the tip of the corresponding inner side elastic finger 31 or the tip of the corresponding inner side elastic finger 41 in a process that the pluggable module 200 is pulling out from the corresponding insertion space 13.

It is noted that, although in the above embodiments, the metal shielding cage 1 is at least constructed with the protecting protrusion 16 which is form on the bottom wall 132, or is at least constructed with the protecting protrusions 16 which are formed on the bottom wall 132 and the two side walls 133, in other implementing manners, the metal shielding cage 1 also may be constructed with the protecting protrusion 16 which is formed on the inner side surface of at least one of the top wall 131, the bottom wall 132 and the two side walls 133.

In conclusion, the connector assembly 100 of the present disclosure includes the protecting protrusion 16 which is constructed to the inner side surface of at least one of the top wall 131, the bottom wall 132 and two side walls 133 of the metal shielding cage 1, the protecting protrusion 16 is adjacent to the corresponding inner side elastic finger 31 or the corresponding inner side elastic finger 41 and is positioned behind the corresponding inner side elastic fingers 31 or the corresponding inner side elastic finger 41, to avoid the pluggable module 200 which inserts into the corresponding insertion space 13 hooking and pulling the tip of the corresponding inner side elastic finger 31 or the tip of the corresponding inner side elastic finger 41 in a process that the pluggable module 200 is pulled out from the corresponding insertion space 13, so as to function as protecting the corresponding inner side elastic finger 31 or the corresponding inner side elastic finger 41.

However, what is described above is just the embodiments of the present disclosure, which is not intended to limit the scope implementing the present disclosure, any simple equivalent variations and modifications made according to the claims and the specification of the present disclosure will also be fallen within the scope of the present disclosure.

What is claimed is:

1. A connector assembly, comprising:

a metal shielding cage having an insertion space and a top wall, a bottom wall, and two side walls which define the insertion space, the insertion space having a front end opening; and a grounding member provided at the front end opening of the metal shielding cage, the grounding member having a plurality of inner side elastic fingers which are positioned to an inner side of the metal shielding cage, wherein the metal shielding cage is constructed with a protecting protrusion formed on an inner side surface of the bottom wall and a locking elastic tab formed in each side wall of the two side walls, the protecting protrusion being adjacent to a corresponding inner side elastic finger, being positioned behind the corresponding inner side elastic finger, and protruding toward the insertion space.

2. The connector assembly of claim 1, wherein the protecting protrusion has an elongated protruding bar which extends transversely.

3. The connector assembly of claim 1, wherein the protecting protrusion has a plurality of protruding blocks which are arranged transversely.

4. The connector assembly of claim 1, wherein the metal shielding cage further comprises a second protecting protrusion formed on an inner side surface of the top wall.

5. The connector assembly of claim 1, wherein the metal shielding cage further comprises:

a second protecting protrusion formed on an inner side surface of a first side wall of the two side walls; and a third protecting protrusion formed on an inner side surface of a second side wall of the two side walls, wherein the second protecting protrusion is positioned between a first inner side elastic finger and the locking elastic tab formed in the first side wall; and the third protecting protrusion is positioned between a second inner side elastic finger and the locking elastic tab formed in the second side wall.

6. The connector assembly of claim 1, wherein the metal shielding cage has a plurality of latching apertures which are spaced apart from the front end opening, and each inner side elastic finger has a hook portion which is assembled to a corresponding latching aperture.

7. The connector assembly of claim 6, wherein each inner side elastic finger further has two wing portions which protrude from two sides of the hook portion, the hook portion and the two wing portions of each inner side elastic finger pass through a corresponding latching aperture from one side of the corresponding latching aperture and bend back and latch with the other side of the corresponding latching aperture.

8. The connector assembly of claim 1, wherein the grounding member further has a plurality of outer side elastic fingers which are positioned to an outer side of the metal shielding cage.

9. A connector assembly, comprising:

a metal shielding cage having a front end opening, an insertion space, and a top wall, a bottom wall, and two side walls; and a grounding member provided at the front end opening of the metal shielding cage, the grounding member having a plurality of inner side elastic fingers assembled to latching apertures in the metal shielding cage, wherein the metal shielding cage comprises a protecting protrusion formed on an inner side surface of the bottom wall and a locking elastic tab formed in at least one of the two side walls, the protecting protrusion being adjacent to at least one of the latching apertures and protruding toward the insertion space.

10. The connector assembly of claim 9, wherein the protecting protrusion has an elongated protruding bar which extends transversely.

11. The connector assembly of claim 9, wherein the metal shielding cage further comprises a second protecting protrusion formed on the top wall.

12. A connector assembly, comprising:

a metal shielding cage having an insertion space and a top wall, a bottom wall, and two side walls which define the insertion space, the insertion space having a front end opening; and a grounding member provided at the front end opening of the metal shielding cage, the grounding member having a plurality of inner side elastic fingers which are positioned to an inner side of the metal shielding cage, wherein the metal shielding cage is constructed with a protecting protrusion on each side wall positioned between the grounding member and a locking elastic tab in each side wall, each protecting protrusion being adjacent to a corresponding inner side elastic finger of the grounding member, positioned behind the corresponding inner side elastic finger, and protruding toward the insertion space.

13. The connector assembly of claim 12, wherein the metal shielding cage further comprises a second protecting protrusion formed on the bottom wall.

14. The connector assembly of claim 12, wherein the metal shielding cage further comprises a second protecting protrusion formed on the top wall.

15. The connector assembly of claim 12, wherein the metal shielding cage further comprises a second protecting protrusion formed on the top wall and a third protecting protrusion formed on the bottom wall.

* * * * *